US012748939B2

(12) United States Patent
Kajikiya

(10) Patent No.: US 12,748,939 B2
(45) Date of Patent: Sep. 29, 2026

(54) IC CARD

(71) Applicant: TDK Corporation, Tokyo (JP)

(72) Inventor: Shoma Kajikiya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 19/257,473

(22) Filed: Jul. 2, 2025

(65) Prior Publication Data

US 2026/0010753 A1 Jan. 8, 2026

(30) Foreign Application Priority Data

Jul. 3, 2024 (JP) ................................ 2024-107277

(51) Int. Cl.
*G06K 19/077* (2006.01)

(52) U.S. Cl.
CPC .................. *G06K 19/07747* (2013.01); *G06K 19/07722* (2013.01); *G06K 19/07783* (2013.01)

(58) Field of Classification Search
CPC ....... G06K 19/07747; G06K 19/07722; G06K 19/07783
See application file for complete search history.

(56) References Cited

U.S. PATENT DOCUMENTS

2017/0308785 A1* 10/2017 Kim ................. G06K 19/07722
2018/0339503 A1* 11/2018 Finn ..................... H01Q 1/2225
2019/0220723 A1* 7/2019 Herslow ............ G06K 19/0723
2020/0034679 A1 1/2020 Proye et al.
2022/0138522 A1 5/2022 Lotya et al.
2023/0027761 A1 1/2023 Kim

FOREIGN PATENT DOCUMENTS

JP 2019-511782 A 4/2019
JP 2023-010670 A 1/2023

* cited by examiner

*Primary Examiner* — Sonji N Johnson
(74) *Attorney, Agent, or Firm* — XSENSUS LLP

(57) ABSTRACT

An IC card includes a metal plate having a through hole penetrating therethrough in one direction, a metal support member disposed inside the through hole and separated from the metal plate, and an IC module supported inside the through hole by the support member. The support member has a cavity penetrating therethrough in the one direction and accommodating a part of the IC module and a slit extending from the cavity to a periphery thereof.

20 Claims, 11 Drawing Sheets

IC CARD

CROSS-REFERENCE TO RELATED APPLICATION

This application claims the benefit of Japanese Patent Application No. 2024-107277, filed on Jul. 3, 2024, the entire disclosure of which is incorporated by reference herein.

BACKGROUND

The present disclosure relates to an IC card.

JP 2023-010670A discloses an IC card including a metal layer having a COB (Chip On Board) cavity, a COB housed in the COB cavity, and an antenna coil. In the COB cavity, the COB is held in place by a PVC insert.

SUMMARY

An IC card according to an embodiment of the present disclosure includes: a metal plate having a first through hole penetrating therethrough in the thickness direction; a metal support member disposed at least partially inside the first through hole and separated from the metal plate; and an IC module supported inside the first through hole by the support member, wherein the support member has a cavity penetrating therethrough in a thickness direction and accommodating a part of the IC module and a slit extending from the cavity to the periphery thereof.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

One of the key challenges for an IC card, which has a metal layer like the one disclosed in JP 2023-010670A, is to enhance a solid and heavy feel.

The present disclosure describes a technology for enhancing the solid and heavy feel of an IC card having a metal plate.

Hereinafter, preferred embodiments of the present disclosure will be described in detail below with reference to the accompanying drawings.

Figure 1:
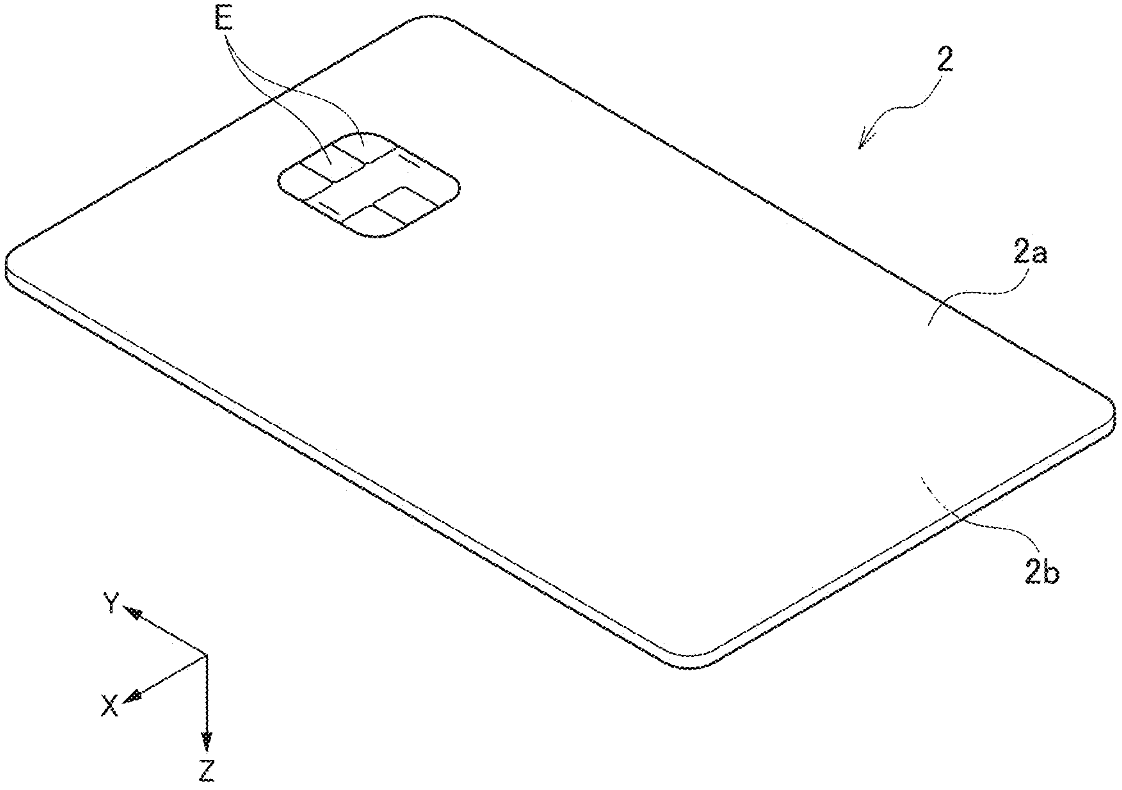
FIG. 1 is a schematic perspective view illustrating the outer appearance of an IC card 2 according to a first embodiment of the present disclosure.

FIG. 1 is a schematic perspective view illustrating the outer appearance of an IC card 2 according to a first embodiment of the present disclosure.

As illustrated in FIG. 1, the IC card 2 according to the first embodiment has a plate-like shape in which the Y-, X-, and Z-directions are defined as the longer length direction, shorter length direction, and thickness direction, respectively, and has an upper surface 2*a* and a back surface 2*b* which constitute the XY plane. The IC card 2 embeds therein an IC module to be described later whose terminal electrode E is exposed on the upper surface 2*a* of the IC card 2.

Figure 2:
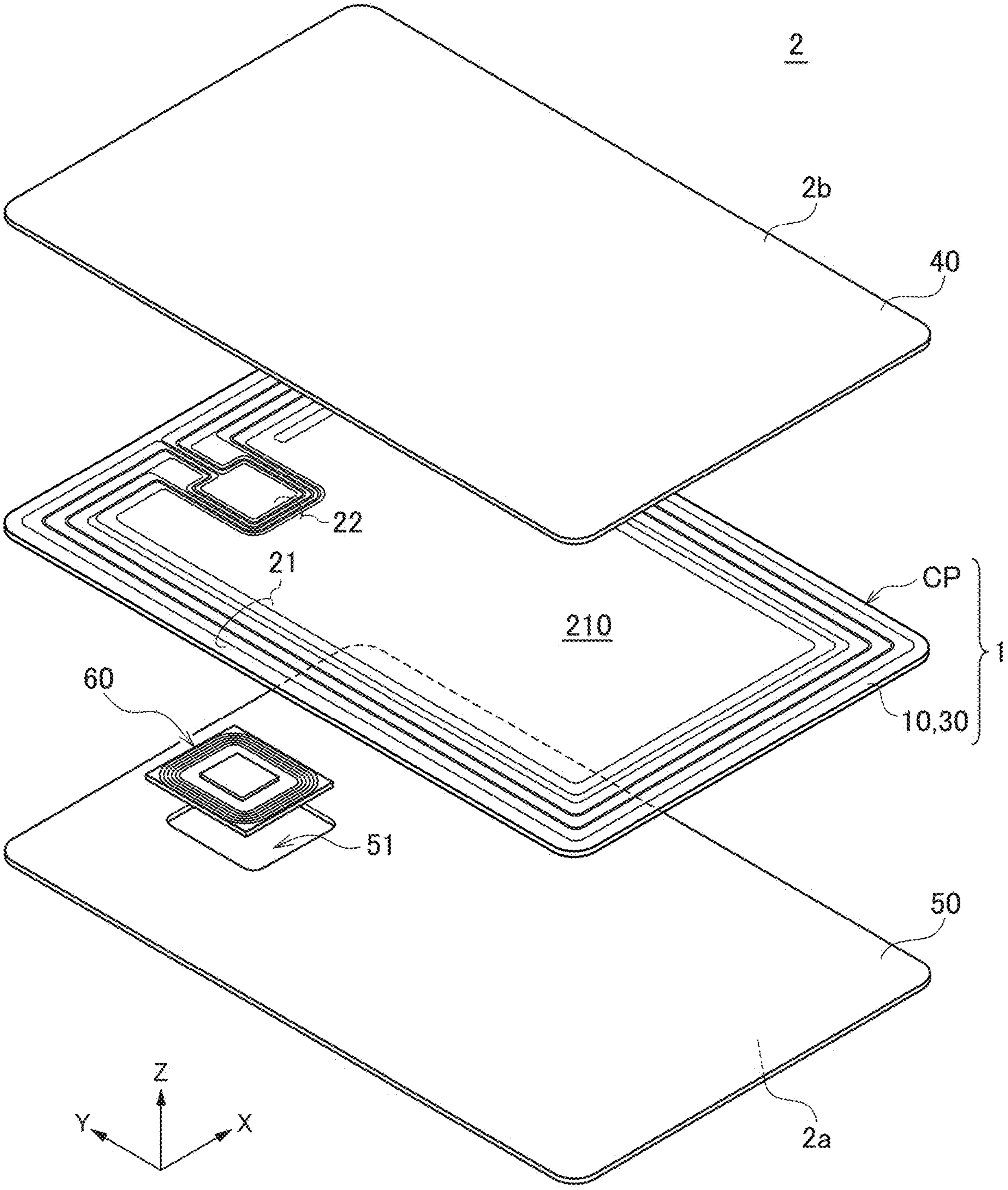
FIG. 2 is a schematic exploded perspective view for explaining the structure of the IC card 2.
Figure 3:
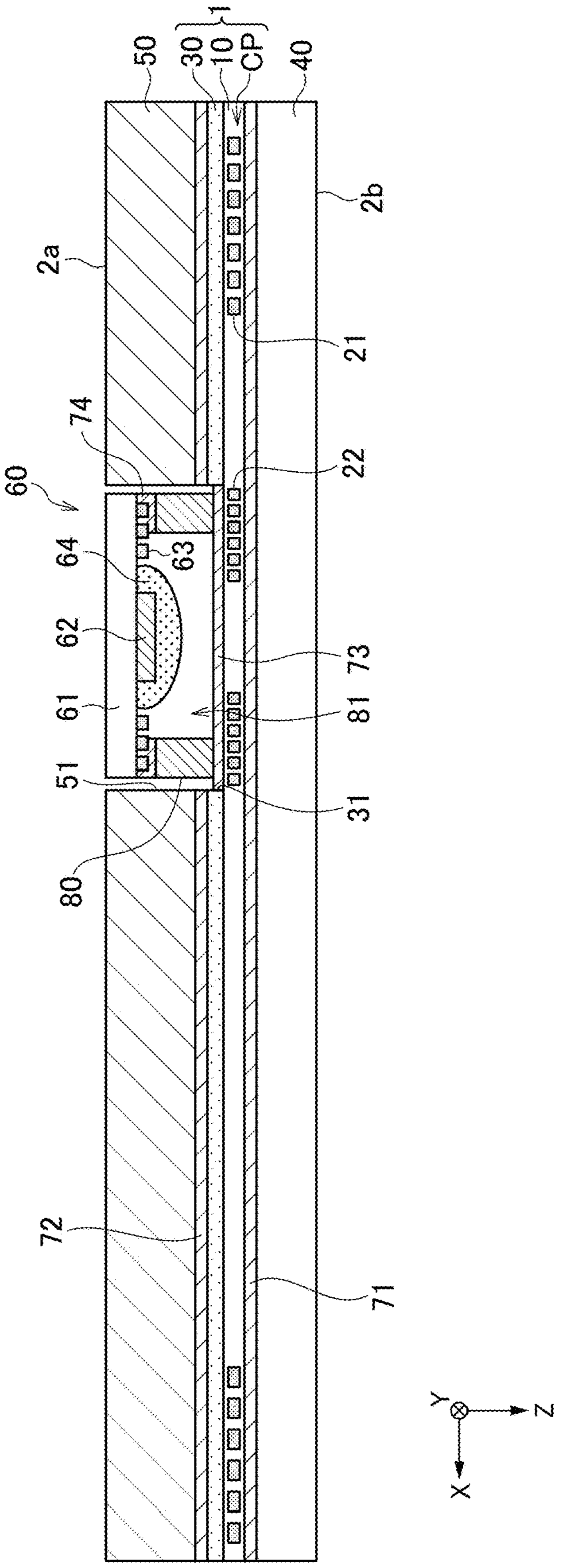
FIG. 3 is a schematic cross-sectional view for explaining the structure of the IC card 2.

FIGS. 2 and 3 are respectively a schematic exploded perspective view and a schematic cross-sectional view for explaining the structure of the IC card 2 according to the first embodiment.

As illustrated in FIGS. 2 and 3, the IC card 2 according to the first embodiment has a structure in which a plastic plate 40, a coil component 1, and a metal plate 50 are laminated in this order from the back surface 2*b* side to the upper surface 2*a* side. The coil component 1 includes a magnetic body 30, a coil pattern CP, and a resin layer 10. The coil pattern CP and resin layer 10 are disposed on one surface side of the magnetic body 30 in the positive Z-direction. The coil pattern CP may be embedded in the resin layer 10. The other surface of the magnetic body 30 in the negative Z-direction is covered with the metal plate 50. The magnetic body 30 may be a sheet-like member.

The magnetic body 30 and metal plate 50 respectively have a through hole 31 and a through hole 51. The through holes 31 and 51 overlap each other in the Z-direction as the lamination direction. The plastic plate 40 and coil component 1 are bonded together through an adhesive layer 71. The metal plate 50 and coil component 1 are bonded together through an adhesive layer 72. Examples of the material of the adhesive layers 71 and 72 include an acrylic-based double-sided tape, a thermosetting resin, and a thermoplastic resin.

The plastic plate 40 is made of a resin material not blocking magnetic flux. The outer surface of the plastic plate 40 constitutes the back surface 2*b* of the IC card 2. The metal plate 50 is made of a metal material such as stainless steel or titanium. The outer surface of the metal plate 50 constitutes the upper surface 2*a* of the IC card 2. The metal plate 50 has the through hole 51, inside of which at least a part of a support member 80 and an IC module 60 are disposed. As described above, the IC card 2 according to the present embodiment is a card using a metal plate as its main body.

As illustrated in FIGS. 2 and 3, the coil pattern CP is formed from a conductor pattern wound in a plurality of turns. Each of the plurality of turns constituting the coil pattern CP has a first winding part 21 wound in a first direction along the outer edge of the magnetic body 30 so as to overlap the magnetic body 30 and a second winding part 22 positioned in an opening region 210 surrounded by the first winding part 21 and wound in a second direction opposite to the first direction. The second winding part 22 of the coil pattern CP overlaps at least partially the through hole 31 of the magnetic body 30. As a result, the second winding part 22 of the coil pattern CP overlaps partially the IC module 60 disposed inside the through hole 51 of the metal plate 50 in the Z-direction through the through hole 31 of the magnetic body 30.

The first winding part 21 of the coil pattern CP functions as an antenna coil magnetically coupled to an external card reader in actual use. The second winding part 22 of the coil pattern CP functions as a coupling coil magnetically coupled to the IC module 60. The second winding part 22 may function as a part of the antenna coil magnetically coupled to an external card reader. By setting the resonance frequency of the coil pattern CP to 13.56 MHz or a frequency band around 13.56 MHz, NFC (Near Field Communication) between an external card reader and the IC card 2 is enabled.

Figure 4:
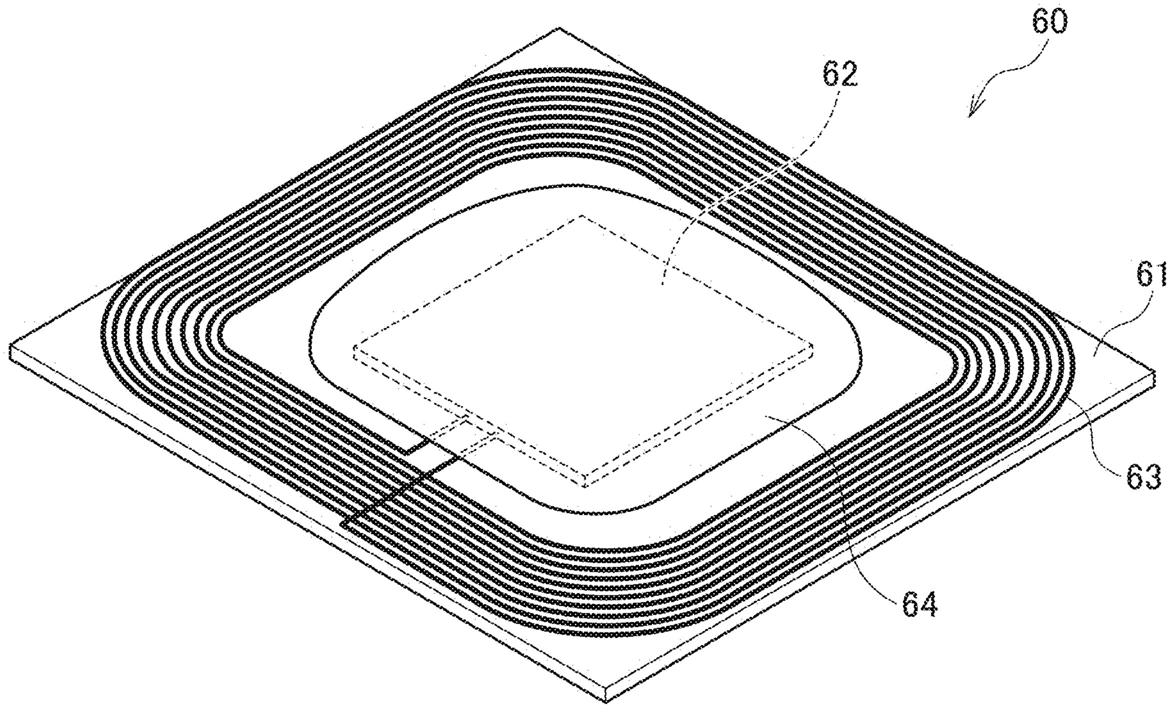
FIG. 4 is a schematic perspective view of the IC module 60 as seen from the back surface side thereof.

FIG. 4 is a schematic perspective view of the IC module 60 as seen from the back surface side thereof.

As illustrated in FIG. 4, the IC module 60 includes a module substrate 61, an IC chip 62 mounted on or embedded in the module substrate 61, and a coupling coil 63. The IC chip 62 is protected by being covered with a dome-shaped protective resin 64. The protective resin 64 is made of an insulating member. The terminal electrode E illustrated in FIG. 1 is provided on the front surface side of the module substrate 61. The IC module 60 thus configured is accommodated inside the through hole 51 formed in the metal plate 50 and supported by the support member 80. In a state where the IC module 60 is accommodated inside the through hole 51, the coupling coil 63 and the second winding part 22 constituting a part of the coil pattern CP are magnetically coupled to each other. Since the second winding part 22 of the coil pattern CP is connected to the first winding part 21 constituting another part of the coil pattern CP and functioning as an antenna coil, the IC module 60 can communicate with an external device through the first winding part 21 of the coil pattern CP.

Figure 5:
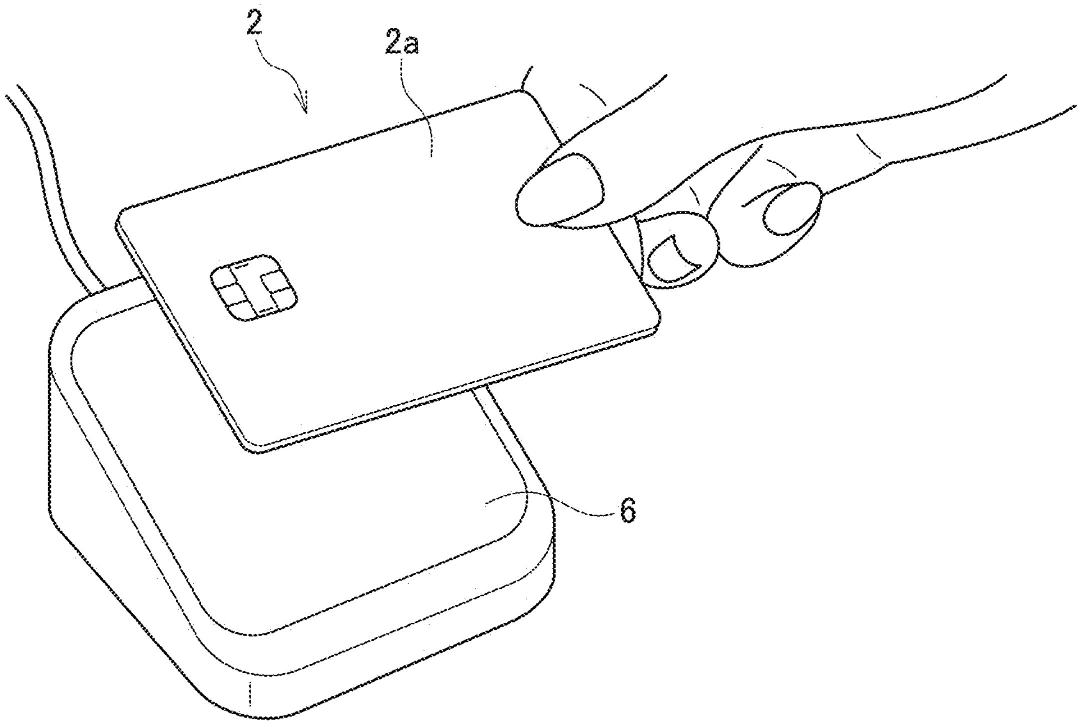
FIG. 5 is a schematic diagram showing a state in which the IC card 2 and the card reader 6 communicate with each other.

Thus, as illustrated in FIG. 5, when the back surface 2*b* of the IC card 2 is made to face a card reader 6, communication can be performed between the card reader 6 and the IC chip 62. That is, the card reader 6 is magnetically coupled to the coupling coil 63 of the IC module 60 through the coil pattern CP and can thereby communicate with the IC chip 62.

Figure 6A:
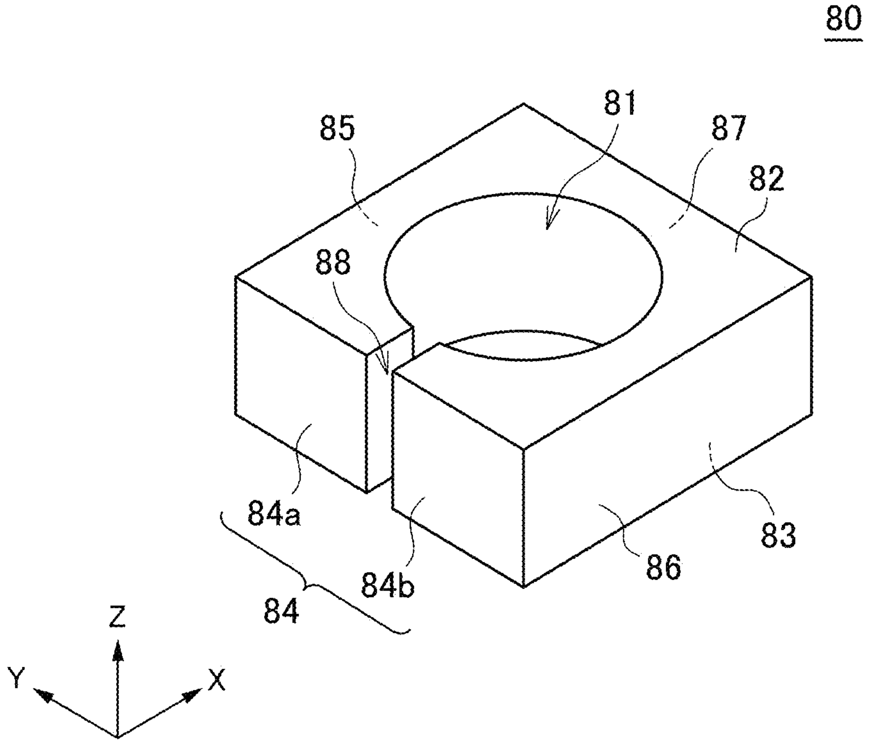
FIG. 6A is a schematic perspective view for explaining the structure of the support member 80.
Figure 6B:
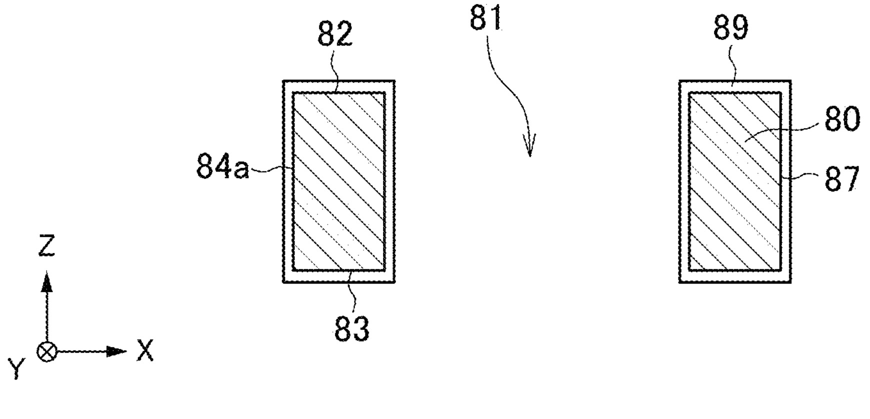
FIG. 6B is a schematic cross-sectional view for explaining the structure of the support member 80.

FIG. 6 is a view for explaining the structure of the support member 80 accommodated inside the through hole 51 of the metal plate 50, where (a) is a schematic perspective view, and (b) is a schematic cross-sectional view.

The support member 80 is a single metal member used for supporting the IC module 60 inside the through hole 51 of the metal plate 50. The support member 80 may be constituted by a plurality of metal members; however, when it is constituted by a single member, stability thereof is enhanced to stabilize the mounting position of the IC module 60. For example, the IC module 60 is inserted into the through hole 51 of the metal plate 50 while being bonded to and supported by the support member 80. The support member 80 may be completely or only partially placed inside the through hole 51 of the metal plate 50. As illustrated in FIG. 6(*a*), the support member 80 has a substantially rectangular parallelepiped outer shape and has a cavity 81 penetrating therethrough in the Z-direction. More specifically, the support member 80 has upper and lower surfaces 82 and 83 constituting the XY plane and located on mutually opposite sides, side surfaces 84 and 87 constituting the YZ plane and located on mutually opposite sides, and side surfaces 85 and 86 constituting the XZ plane and located on mutually opposite sides. The cavity 81 penetrates through the support member 80 from the center of the upper surface 82 to the center of the lower surface 83.

As illustrated in FIG. 3, a part of the IC module 60, for example, a part of the protective resin 64 is accommodated in the cavity 81 of the support member 80. The upper surface 82 of the support member 80 is bonded to the resin layer 10 through an adhesive layer 73 provided at a position overlapping the through hole 51 of the metal plate 50 and the through hole 31 of the magnetic body 30. The lower surface 83 of the support member 80 is bonded to the module substrate 61 of the IC module 60 through an adhesive layer 74 made of hot-melt resin.

The support member 80 further has a slit 88 extending from the cavity 81 to the periphery thereof. The periphery refers to the outer peripheral surfaces of the support member 80, and more specifically, to the side surfaces 84 to 87 of the support member 80 which are parallel to the Z-direction. In the example illustrated in FIG. 6(*a*), the slit 88 extends from the cavity 81 to the side surface 84. The slit 88 completely divides the side surface 84. In the example illustrated in FIG. 6(*a*), the side surface 84 is divided into two regions 84*a* and 84*b*. By providing the thus configured slit 88, the support member 80 member A no longer forms a complete cylindrical body, and when the Z-direction is considered as the axial direction, current is prevented from circulating around the cavity 81.

Thus, even though the support member 80 is a metal member, magnetic coupling between the second winding part 22 of the coil pattern CP and the coupling coil 63 of the IC module 60 is established. Further, at least the metal part of the support member 80 is disposed inside the through hole 51 spaced apart from the metal plate 50 without contacting it, whereby insulation from the metal plate 50 is ensured. To more reliably achieve insulation between the support member 80 and the metal plate 50, an insulating member 89 covering the surface of the support member 80 may be provided as illustrated in FIG. 6(*b*). Further, in the present embodiment, since the support member 80 is a single member, the number of components is reduced.

In addition, since the support member 80 is a metal member, the weight of the IC card becomes heavier, whereby a solid and heavy feel is imparted to the IC card 2. To further enhance the solid and heavy feel of the IC card 2, a metal with a higher specific gravity than that constituting the metal plate 50 may be used as the metal constituting the support member 80. For example, when the metal plate 50 is made of stainless steel or titanium, it is possible to use tungsten, gold, platinum, lead or the like may be used as the metal constituting the support member 80. Further, by increasing the thickness of the support member 80 in the Z-direction within the range that allows the IC module 60 to be accommodated inside the through hole 51 of the metal plate 50, the solid and heavy feel of the IC card 2 can be further enhanced. For example, the thickness of the support member 80 in the Z-direction may be made larger than the total thickness of the module substrate 61 and IC chip 62 in the Z-direction.

Further, the support member 80, the second winding part 22 of the coil pattern CP, and the coupling coil 63 of the IC module 60 may partially overlap one another in a plan view seen from the Z-direction which is the thickness direction. In the example illustrated in FIG. 3, the inner wall of the cavity 81 of the support member 80 is located between the outer and inner peripheral edges of the second winding part 22 of the coil pattern CP and between the outer and inner peripheral edges of the coupling coil 63. This makes it possible to sufficiently ensure the mass of the support member 80 while establishing magnetic coupling between the second winding part 22 of the coil pattern CP and the coupling coil 63.

Figure 7:
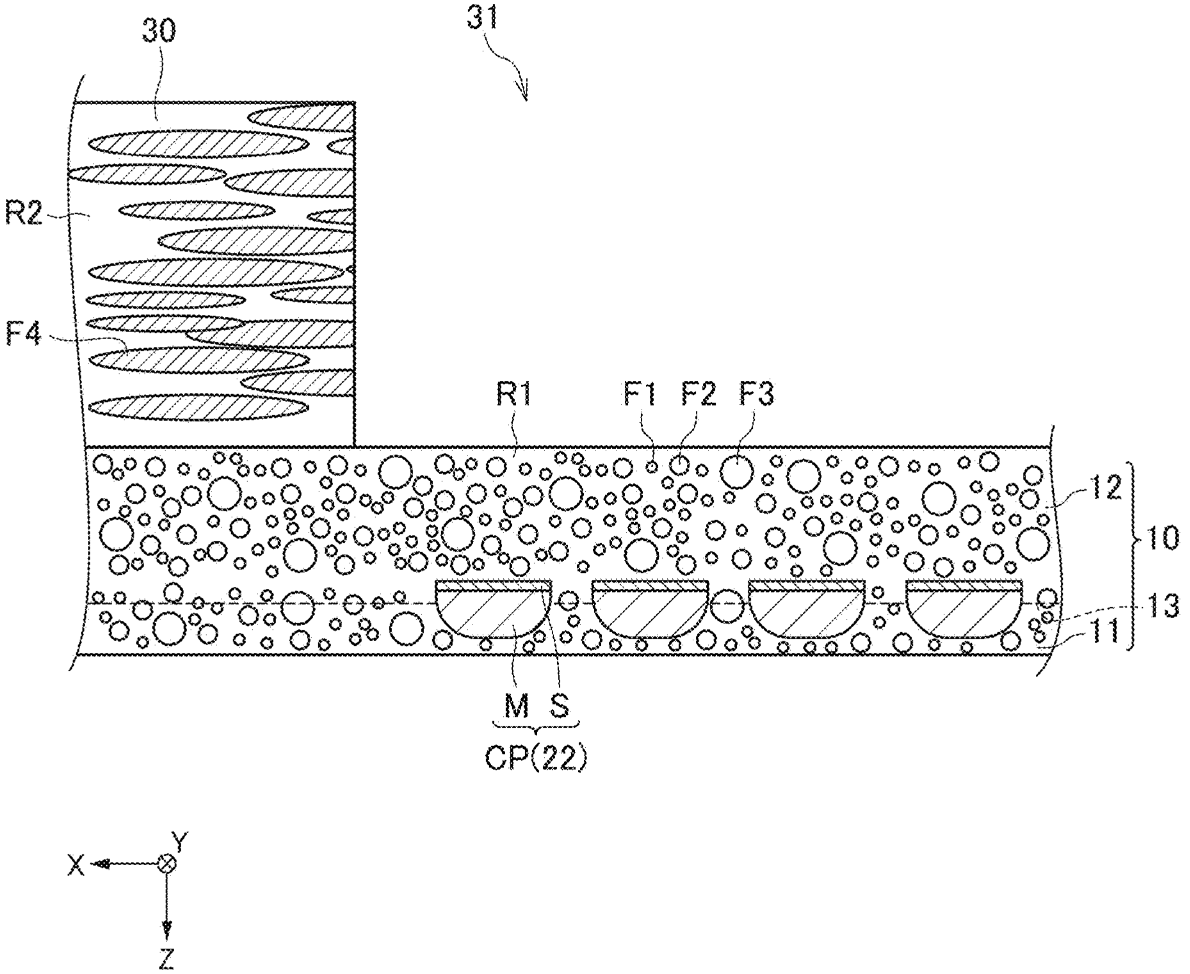
FIG. 7 is a schematic cross-sectional view for explaining the structures of the resin layer 10 and magnetic body 30.

FIG. 7 is a schematic cross-sectional view for explaining the structures of the resin layer 10 and magnetic body 30.

In the example illustrated in FIG. 7, the coil pattern CP is embedded in the resin layer 10. The resin layer 10 has a structure in which a first layer 11 and a second layer 12 are laminated in the Z-direction. When the first and second layers 11 and 12 are made of the same material, a boundary 13, which is the boundary therebetween, is not necessarily clear.

The coil pattern CP includes a seed part S and a main body part M. The seed part S contains resin. The main body part M is made of a metal material and laminated on the seed part S. The metal material constituting the main body part M may be Cu. The seed part S may contain a material functioning as a catalyst when the main body part M is formed by plating. The conductivity of the main body part M may be higher than that of the seed part S. The thickness of the main body part M may be larger than that of the seed part S. With this configuration, the resistance value of the coil pattern CP can be reduced. In the example illustrated in FIG. 7, the entire surface of the coil pattern CP is covered with the resin layer 10.

The coil pattern CP is formed on the surface of a not-shown substrate and embedded in the first layer 11, followed by removal of the substrate and formation of the second layer 12. The resin layer 10 may contain particles and binder resin R1. The particles contained in the resin layer 10 may be inorganic filler particles or black-colored pigment particles. The material of the inorganic filler particles may be a nonmagnetic inorganic material such as alumina, aluminum hydroxide, talc, magnesium hydroxide, silica, calcium carbonate, barium titanate, zirconium titanate, or zinc zirconate titanate. When inorganic filler particles are used as the particles contained in the resin layer 10, insulating inorganic filler particles F1 to F3 having mutually different particle diameters may be used. By thus using the three inorganic filler particles F1 to F3 having mutually different particle diameters, the filling rate of the inorganic filler particles in the resin layer 10 is increased.

The magnetic body 30 is used to prevent magnetic flux from being applied to the metal plate 50 by covering the first winding part 21 of the coil pattern CP. In at least a part of region overlapping the second winding part 22 of the coil pattern CP as a coupling coil, the magnetic body 30 is not provided, and the through hole 31 is formed instead. The magnetic body 30 may be a magnetic resin layer containing flat magnetic powders F4 and binder resin R2. The flat magnetic powders F4 may be made of a metal magnetic material such as sendust, permalloy, Fe—Si—Cr-based alloy magnetic body, Fe—Si—Al—Cr-based alloy magnetic body, or Fe—Al—Cr-based alloy magnetic body. The thickness direction of the flat magnetic powders F4 is the Z-direction, and the longer side direction thereof is the XY plane direction perpendicular to the Z-direction. The flat magnetic powders F4 are oriented such that the longer side direction thereof is substantially parallel to the XY plane direction. This increases the permeability of the magnetic body 30 in the XY plane direction.

Figure 8:
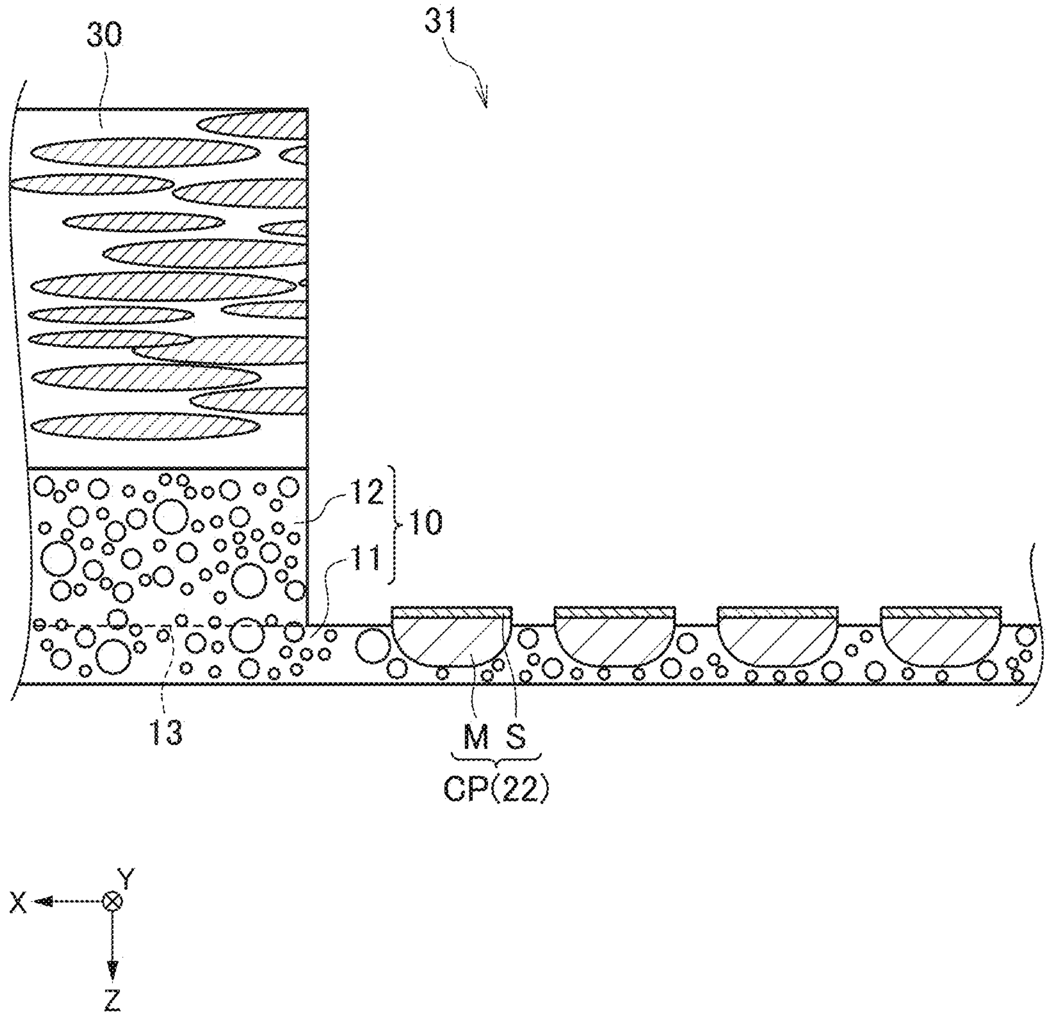
FIG. 8 is a schematic cross-sectional view for explaining the structures of the resin layer 10 and magnetic body 30 according to a modification.

FIG. 8 is a schematic cross-sectional view for explaining the structures of the resin layer 10 and magnetic body 30 according to a modification.

The modification illustrated in FIG. 8 differs from the structure illustrated in FIG. 7 in that the second layer 12 of the resin layer 10 is removed at the position overlapping the through hole 31 of the magnetic body 30. As a result, the second winding part 22 of the coil pattern CP is exposed from the resin layer 10. Other basic configurations are the same as those of the structure illustrated in FIG. 7, so the same reference numerals are given to the same elements, and overlapping description will be omitted. According to the structure illustrated in FIG. 8, it is possible to prevent interference between the IC module 60 and the resin layer 10 even when the IC module 60 is even thicker. The surface of the second winding part 22 of the coil pattern CP that is exposed from the resin layer 10 is constituted by the seed part S having a conductivity lower than that of the main body part M, so that a reduction in reliability due to the exposure of the coil pattern CP can be reduced.

Figure 9:
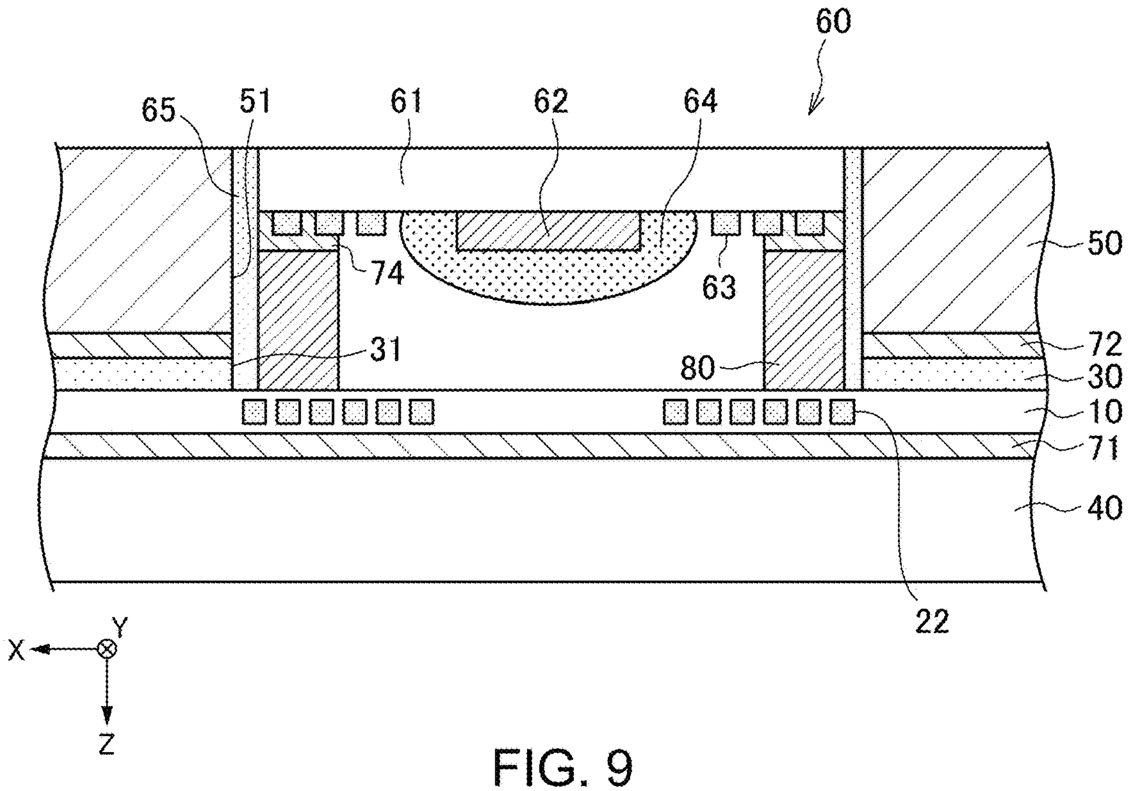
FIG. 9 is a schematic partial cross-sectional view illustrating a first modification of the IC module 60 and its surrounding structure.

FIG. 9 is a schematic partial cross-sectional view illustrating a first modification of the IC module 60 and its surrounding structure.

The first modification illustrated in FIG. 9 differs from the structure illustrated in FIG. 3 in that the adhesive layer 73 is omitted and that a resin member 65 is newly provided. Other basic configurations are the same as those of the structure illustrated in FIG. 3, so the same reference numerals are given to the same elements, and overlapping description will be omitted. The first modification illustrated in FIG. 9 is a structure applicable when, as illustrated in FIG. 7, at the position overlapping the through hole 31 of the magnetic body 30, the coil pattern CP is not exposed, and the binder resin R1 constituting the resin layer 10 and having adhesiveness over its entire surface is exposed. In this case, the support member 80 is directly bonded to the binder resin R1 of the resin layer 10. This eliminates the need for the adhesive layer 73 to be provided, allowing the thickness of the support member 80 to be increased by the thickness of the adhesive layer 73, which can further enhance the solid and heavy feel of the IC card 2. On the other hand, as illustrated in FIG. 8, when the coil pattern CP is exposed at the position overlapping the through hole 31 of the magnetic body 30, bonding of the support member 80 can be achieved using the adhesive layer 73, as explained with reference to FIG. 3.

Further, in the first modification illustrated in FIG. 9, the resin member 65 is filled in the gap between the metal plate 50 and the support member 80 inside the through hole 51. The resin member 65 may be in contact with the magnetic body 30. Filling the resin member 65 into the through hole 51 allows the IC module 60 to be more securely fixed inside the through hole 51 and enhances insulation between the metal plate 50 and the support member 80.

Figure 10:
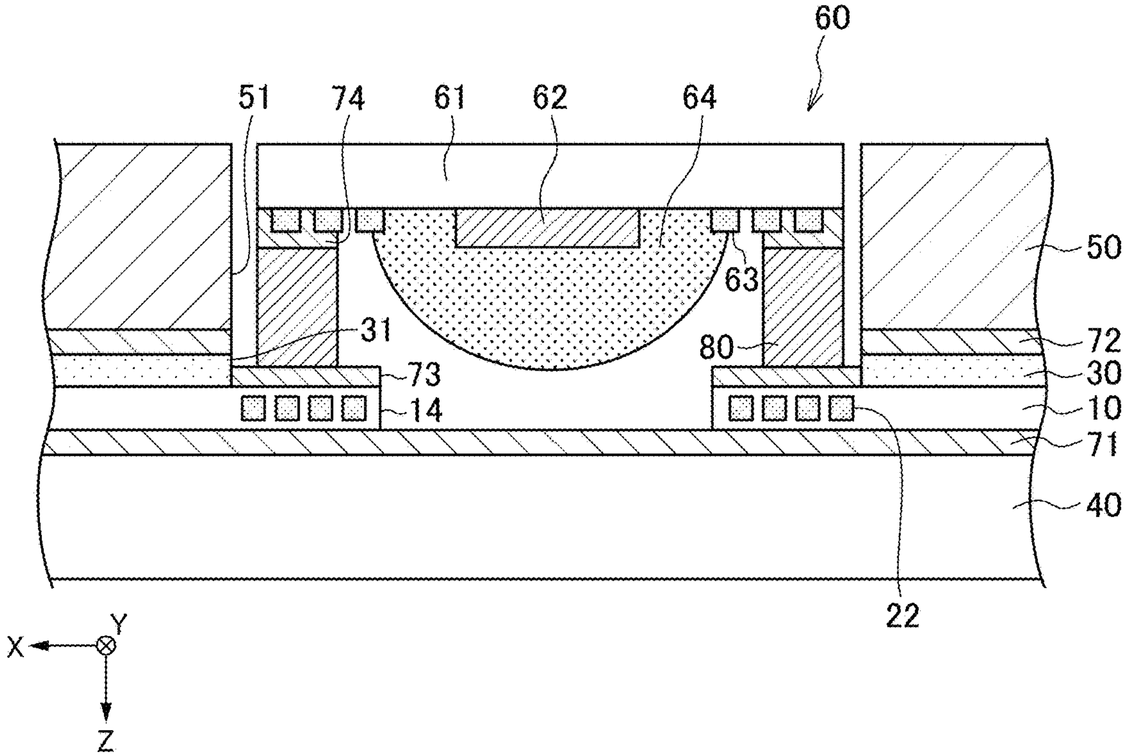
FIG. 10 is a schematic partial cross-sectional view illustrating a second modification of the IC module 60 and its surrounding structure.

FIG. 10 is a schematic partial cross-sectional view illustrating a second modification of the IC module 60 and its surrounding structure.

The second modification illustrated in FIG. 10 differs from the structure illustrated in FIG. 3 in that the adhesive layer 73 and resin layer 10 are partially removed at a position overlapping, in a plan view, the opening region surrounded by the second winding part 22 of the coil pattern CP and that the size of the protective resin 64 is increased. Other basic configurations are the same as those of the structure illustrated in FIG. 3, so the same reference numerals are given to the same elements, and overlapping description will be omitted. A through hole 14 formed in the resin layer 10 overlaps the through hole 51 of the metal plate 50 and the through hole 31 of the magnetic body 30. According to the second modification illustrated in FIG. 10, even when the protective resin 64 of the IC module 60 has a large height in the Z-direction, interference between the protective resin 64 and the resin layer 10 can be prevented.

Figure 11:
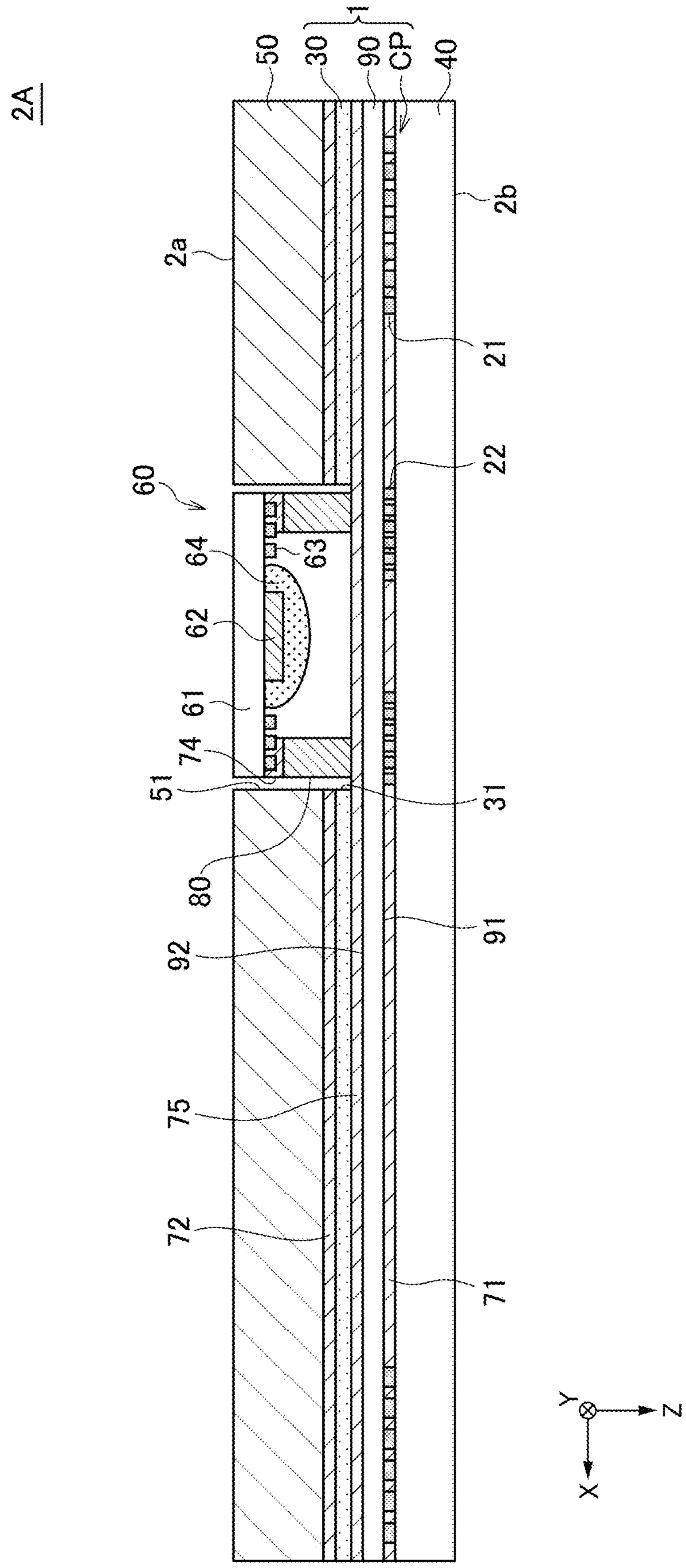
FIG. 11 is schematic cross-sectional view for explaining the structure of an IC card 2A according to a second embodiment.

FIG. 11 is schematic cross-sectional view for explaining the structure of an IC card 2A according to a second embodiment.

As illustrated in FIG. 11, the IC card 2A according to the second embodiment differs from the IC card 2 according to the first embodiment in that the coil pattern CP is provided on one surface 91 of a substrate 90 made of a PET film or the like. The other surface 92 of the substrate 90 is bonded to the magnetic body 30 through an adhesive layer 75. Other basic configurations are the same as those of the IC card 2 according to the first embodiment, so the same reference numerals are given to the same elements, and overlapping description will be omitted.

As exemplified by the IC card 2A according to the second embodiment, it is not essential for the coil pattern CP to be embedded in the resin layer 10, but the coil pattern CP may be provided on the surface 91 of the substrate 90 made of a PET film or the like. In the example illustrated in FIG. 11, the support member 80 is bonded to the adhesive layer 75.

Figure 12:
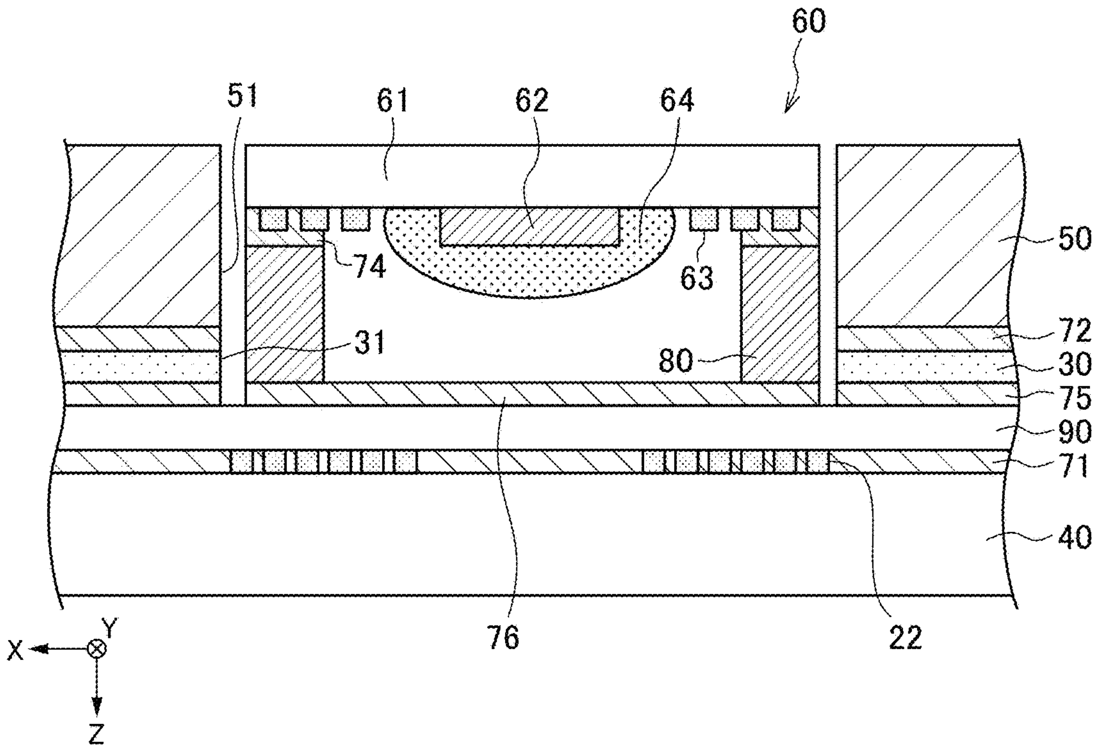
FIG. 12 is a schematic partial cross-sectional view illustrating a third modification of the IC module 60 and its surrounding structure.

FIG. 12 is a schematic partial cross-sectional view illustrating a third modification of the IC module 60 and its surrounding structure.

The third modification illustrated in FIG. 12 differs from the structure illustrated in FIG. 11 in that, at the region overlapping the through hole 51 of the metal plate 50 and the through hole 31 of the magnetic body 30, the adhesive layer 75 is removed, and instead, another adhesive layer 76 is provided. Other basic configurations are the same as those of the structure illustrated in FIG. 11, so the same reference numerals are given to the same elements, and overlapping description will be omitted. According to the third modification illustrated in FIG. 12, different materials may be used for the respective adhesive layers 75 and 76, and the IC module 60 can be accommodated in the through hole 51 of the metal plate 50 after the adhesive layer 76 is bonded to the support member 80.

Figure 13:
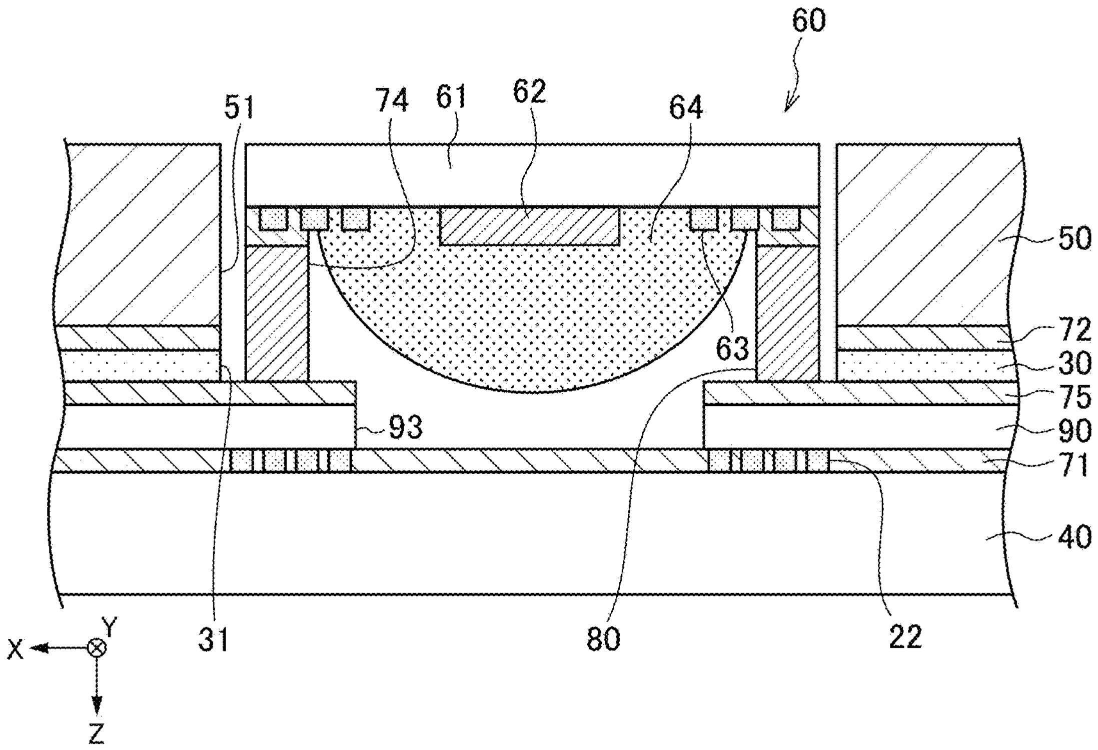
FIG. 13 is a schematic partial cross-sectional view illustrating a fourth modification of the IC module 60 and its surrounding structure.

FIG. 13 is a schematic partial cross-sectional view illustrating a fourth modification of the IC module 60 and its surrounding structure.

The fourth modification illustrated in FIG. 13 differs from the structure illustrated in FIG. 11 in that the adhesive layer 75 and substrate 90 are partially removed at the position overlapping, in a plan view, the opening region surrounded by the second winding part 22 of the coil pattern CP and that the size of the protective resin 64 is increased. Other basic configurations are the same as those of the structure illustrated in FIG. 11, so the same reference numerals are given to the same elements, and overlapping description will be omitted. A through hole 93 formed in the substrate 90 overlaps the through hole 51 of the metal plate 50 and the through hole 31 of the magnetic body 30. According to the fourth modification illustrated in FIG. 13, even when the protective resin 64 of the IC module 60 has a large height in the Z-direction, interference between the protective resin 64 and the substrate 90 can be prevented.

While some embodiments of the technology according to the present disclosure have been described, the technology according to the present disclosure is not limited to the above embodiments, and various modifications may be made within the scope of the present disclosure, and all such modifications are included in the technology according to the present disclosure.

The technology according to the present disclosure includes the following configuration examples, but not limited thereto.

An IC card according to an embodiment of the present disclosure includes: a metal plate having a first through hole penetrating therethrough in the thickness direction; a metal support member disposed at least partially inside the first through hole and separated from the metal plate; and an IC module supported inside the first through hole by the support member, wherein the support member has a cavity penetrating therethrough in a thickness direction and accommodating a part of the IC module and a slit extending from the cavity to the periphery thereof. With this configuration, a solid and heavy feel can be imparted to the IC card.

In the above IC card, the support member may be a single member. This makes it possible to reduce the number of components.

The above IC card may include an insulating member covering the surface of the support member. This makes it possible to easily achieve insulation between the support member and the metal plate.

In the above IC card, the IC module may include an IC chip and a module substrate on which the IC chip is mounted or in which the IC chip is embedded, and the support member may have a thickness larger than the total thickness of the module substrate and IC chip. This makes it possible to further enhance the solid and heavy feel of the IC card.

In the above IC card, the metal constituting the support member may have a higher specific gravity than the metal constituting the metal plate. This makes it possible to further enhance the solid and heavy feel of the IC card.

The above IC card may further include a coil pattern and a magnetic body located between the metal plate and the coil pattern in a thickness direction, the magnetic body may include a second through hole overlapping the first through hole, the coil pattern may include a first winding part overlapping the magnetic body and a second winding part connected to the first winding part and wound along the second through hole of the magnetic body, and the IC module may include a coupling coil magnetically coupled to the second winding part of the coil pattern. This allows the IC module to communicate with an external card reader through the first winding part of the coil pattern.

In the above IC card, the inner wall of the cavity formed in the support member may be located between an outer peripheral edge of the coupling coil and an inner peripheral edge of the coupling coil as viewed from a thickness direction. This makes it possible to increase the mass of the support member while establishing magnetic coupling between the second winding part of the coil pattern and the coupling coil of the IC module.

The above IC cars may further include a resin layer supporting the coil pattern, and the resin layer may have a third through hole overlapping the first through hole and the second through hole. This makes interference between the IC module and the resin layer unlikely to occur.

The above IC card may further include a resin member filled in the gap between the metal plate and the support member inside the first through hole. This allows the support member to be fixed inside the first through hole and can enhance insulation between the metal plate and the support member.

What is claimed is:

1. An IC card comprising:

a metal plate having a first through hole penetrating therethrough in a thickness direction;

a metal support member disposed at least partially inside the first through hole and spaced apart from the metal plate without contacting the metal plate; and an IC module supported inside the first through hole by the metal support member, wherein the metal support member has a cavity penetrating therethrough in a thickness direction and accommodating a part of the IC module and a slit extending from the cavity to a periphery thereof.

2. The IC card as claimed in claim 1, wherein the metal support member is a single member.

3. The IC card as claimed in claim 1, further comprising an insulating member covering a surface of the metal support member.

4. The IC card as claimed in claim 1, wherein the IC module includes an IC chip and a module substrate on which the IC chip is mounted or in which the IC chip is embedded, and wherein the metal support member has a thickness larger than a total thickness of the module substrate and IC chip.

5. The IC card as claimed in claim 1, wherein a metal constituting the metal support member has a higher specific gravity than a metal constituting the metal plate.

6. The IC card as claimed in claim 1, further comprising:

a coil pattern; and a magnetic body located between the metal plate and the coil pattern in a thickness direction, wherein the magnetic body includes a second through hole overlapping the first through hole, wherein the coil pattern includes a first winding part overlapping the magnetic body and a second winding part connected to the first winding part and wound along the second through hole of the magnetic body, and wherein the IC module includes a coupling coil magnetically coupled to the second winding part of the coil pattern.

7. The IC card as claimed in claim 6, wherein an inner wall of the cavity of the metal support member is located between an outer peripheral edge of the coupling coil and an inner peripheral edge of the coupling coil as viewed from a thickness direction.

8. The IC card as claimed in claim 6, further comprising a resin layer supporting the coil pattern, wherein the resin layer has a third through hole overlapping the first through hole and the second through hole.

9. The IC card as claimed in claim 1, further comprising a resin member filled in a gap between the metal plate and the metal support member inside the first through hole.

10. The IC card as claimed in claim 1, further comprising:

a magnetic body including a second through hole overlapping the first through hole, and a coil pattern including a first winding part overlapping the magnetic body and a second winding part connected to the first winding part and wound along the second through hole of the magnetic body.

11. The IC card as claimed in claim 10, wherein the IC module includes a coupling coil magnetically coupled to the second winding part of the coil pattern.

12. The IC card as claimed in claim 11, wherein an inner wall of the cavity of the metal support member is located between an outer peripheral edge of the coupling coil and an inner peripheral edge of the coupling coil as viewed from a thickness direction.

13. The IC card as claimed in claim 1, wherein the slit of the metal support member extends from the cavity in a lateral dimension orthogonal to the thickness direction.

14. An IC card comprising:

a metal plate having a first through hole penetrating therethrough in a thickness direction;

a metal support member disposed at least partially inside the first through hole and separated from the metal plate;

a coil pattern;

a magnetic body located between the metal plate and the coil pattern in a thickness direction; and an IC module supported inside the first through hole by the metal support member, wherein the metal support member has a cavity penetrating therethrough in a thickness direction and accommodating a part of the IC module and a slit extending from the cavity to a periphery thereof, wherein the magnetic body includes a second through hole overlapping the first through hole, wherein the coil pattern includes a first winding part overlapping the magnetic body and a second winding part connected to the first winding part and wound along the second through hole of the magnetic body.

15. The IC card as claimed in claim 14, further comprising a resin layer supporting the coil pattern, wherein the resin layer has a third through hole overlapping the first through hole and the second through hole.

16. The IC card as claimed in claim 14, wherein the slit of the metal support member extends from the cavity in a lateral dimension orthogonal to the thickness direction.

17. The IC card as claimed in claim 14, further comprising a resin member filled in a gap between the metal plate and the metal support member inside the first through hole.

18. The IC card as claimed in claim 14, wherein the metal support member is a single member.

19. The IC card as claimed in claim 14, further comprising an insulating member covering a surface of the metal support member.

20. The IC card as claimed in claim 14, wherein the IC module includes an IC chip and a module substrate on which the IC chip is mounted or in which the IC chip is embedded, and wherein the metal support member has a thickness larger than a total thickness of the module substrate and IC chip.

* * * * *